United States Patent [19]
Wang et al.

[11] Patent Number: 5,572,434
[45] Date of Patent: Nov. 5, 1996

[54] METHOD FOR SIMULATING MOLD FILLING OF SEMI-SOLID MATERIAL

[75] Inventors: Kuo K. Wang; Shau-Poh Wang, both of Ithaca, N.Y.

[73] Assignee: Cornell Research Foundation, Inc., Ithaca, N.Y.

[21] Appl. No.: 259,615

[22] Filed: Jun. 14, 1994

[51] Int. Cl.$^6$ .................................................. G06F 19/00
[52] U.S. Cl. ...................... 364/475.02; 364/578; 425/147
[58] Field of Search .................................... 364/473, 476, 364/578, 148, 149, 468, 510; 264/40.1–40.5; 425/140, 144–148

[56] References Cited

U.S. PATENT DOCUMENTS

| | | |
|---|---|---|
| 3,902,544 | 9/1975 | Wang et al. |
| 4,989,166 | 1/1991 | Kihara et al. ............................ 364/476 |
| 5,031,108 | 7/1991 | Fujita et al. ............................ 364/476 |
| 5,031,127 | 7/1991 | Fujita et al. ............................ 364/776 |
| 5,402,366 | 3/1995 | Kihara et al. ............................ 364/578 |

OTHER PUBLICATIONS

Wang, S. P., et al, "A Net Inflow Method for Incompressible Viscous Flow with Moving Free Surfaces", Int. Jor. for Numerical Methods in Fluids, vol. 18, pp. 669–694.
Wang, S. P. et al., "A Net Inflow Method for Free-Surface Flow in Thin Cavities", Computational Methods in Material Processing, Proceeding of the ASME Winter Annual Meeting, Anaheim, Calif., Nov. 8–13 1992.
Turng, L. S., "Rheological Modeling and Numerical Simulation of Semi–solid Sn–15/5Pb Alloy for Net–shape Die–casting Process", Ph.D. Dissertation, Cornell University, 1990.

Primary Examiner—Roy N. Envall, Jr.
Assistant Examiner—Thomas E. Brown
Attorney, Agent, or Firm—Barnard, Brown & Michaels

[57] ABSTRACT

An efficient numerical procedure for the simulation of Newtonian fluids with non-negligible inertial effect which satisfies the Navier-Stokes equations and the energy equation. The method simulates the molding-filling process of incompressible viscous liquid, e.g. semi-solid metal, in a thin and irregular cavity. The moving free surfaces in an irregular domain is tracked using a fixed-mesh method. The material discontinuities across the interface between air and the liquid are removed by replacing the air with a pseudo-gas which has small density and dynamic viscosity but its kinematic viscosity is the same as that of the liquid. During the filling process, the (semi-solid) liquid may solidify on the mold surface. As a result, the effective cavity thickness reduces non-uniformly according to the result thermal analysis. The Navier-Stokes equations are integrated across the remaining gap by assuming that the velocity profile (not magnitude) is similar to that in a fully-developed flow. The method incorporates general viscosity and solidification models to simulate the filling and solidification processes for the injection molding of Semi-Solid Metal in a two-dimensional thin cavity. The predictions have been compared with experimental results. The simulation results showed not only good agreement with the experiments but also helped explain the flow marks observed on the surface and the phase segregation in the cross section of a rheomolded spiral part.

19 Claims, 4 Drawing Sheets

METHOD FOR SIMULATING MOLD FILLING OF SEMI-SOLID MATERIAL

ACKNOWLEDGMENT OF GOVERNMENT SUPPORT

This invention was made with Government support under Grant No. DDM-8815855, awarded by the National Science Foundation. The government has certain rights in the invention.

FIELD OF THE INVENTION

The invention pertains to the field of injection molding of metals. More particularly, the invention pertains to methods of simulation of the properties of semisolid metals, especially applicable to rheomolding.

BACKGROUND OF THE INVENTION

The discovery of semi-solid alloys and possible new forming processes can be traced back to the work of Flemings, Mahrabian and their co-workers in the early 1970's. See, for example, U.S. Pat. No. 3,902,544, issued to Flemings, et.al. in 1975. It was found that when molten metals were vigorously agitated during the early stage of solidification, the normally occurring dendritic grain structure was broken into a system of granular solid particles suspended in the remaining liquid matrix.

Since then, extensive studies have been carried out toward developing new forming processes for various metals. In particular, one of the major applications of semi-solid alloys has generally centered on the die casting process. Owing to its high and controllable viscosity, the semi-solid alloy can fill the die cavity in a progressive flow pattern, thus reducing the gas porosity typically caused by the turbulent flow of a superheated molten metal. Such viscous flow behavior of the semi-solid alloy not only ensures sound casting, but also makes possible the task of computer simulation which can be used to predict the casting behavior, improve the efficiency of mold design, and decide the appropriate processing conditions such as temperature and injection speed control.

In pressure die casting, the mold temperature is typically much lower than the melt temperature in order to accelerate the cooling and reduce the cycle time. On the other hand, the solid fraction of the Semi-Solid Metal is relatively high (part of latent heat is removed) and the thermal conductivity of a metal is usually high. As a result, premature freezing could occur if the injection and cooling conditions are inappropriate or if the mold is designed improperly. This means that process control is a key to success in this process and the mold design may become more challenging than it is for conventional pressure die casting. Similar to the injection molding of plastics, the efficiency of mold design and the decision-making for the appropriate processing conditions can be significantly improved with the help of numerical simulation techniques.

Furthermore, most metal parts made by pressure die casting are thin, which means that the half thickness of the part is close to or less than 10% of its planar characteristic length. In this case, the liquid velocity and thermal convection in the transverse direction and the viscous diffusion and thermal condition in the planar direction become negligibly small compared with the other components in the governing equations. It should be noted that although turbulence plays an important role in the conventional die-casting process, its effects can be eliminated in rheomolding by controlling the processing parameters and thus the viscosity of Semi-Solid Metal.

The other crucial factor affecting the rheomolding filling process is the rheology of Semi-Solid Metal. It has been found in previous experiments that the Semi-Solid Metal is pseudo-plastic (shear thinning) at steady state and dilatant (shear thickening) under transient conditions. For instance, when the shear rate applied to Sn-15% Pb Semi-Solid Metal changes suddenly, the viscosity remains at the same value instantaneously and then gradually changes for 20 to 30 seconds before the viscosity reaches another steady state. Since most of the filling time in rheomolding is expected to be less than 1 second, it seems viable to assume that the semi-solid slurry is Newtonian in the mold-filling stage.

In plastic injection molding, the polymer melt is highly viscous and has a low density. Therefore, its inertial effect can be neglected in the flow analysis. This simplification, however, does not apply in rheomolding due to the high injection speed and high density of metals. For a Newtonian liquid flowing between two parallel plates, it can be shown analytically that its velocity magnitude may change with respect to time but the velocity profile remains approximately constant, similar to the one under steady-state conditions.

In order to simulate the complete casting procedure, we need a rheological model to describe the history-dependent properties of semi-solid metal under various process conditions and an efficient tool for fluid dynamic and thermal analyses.

A cavity-filling simulation method must satisfy the following conditions:

1. Stability for a wide range of Reynold's number (from 1 to 1,000 or higher);
2. Can handle multi-moving free surfaces including laminar jets;
3. Convenient in use for complex geometry;
4. Efficient and reasonably accurate;
5. Can be easily incorporated with thermal and stress analyses including phase transformation; and
6. Use primary variables such as velocity and pressure.

The reason to choose primary variables instead of stream function or vorticity is for simpler boundary conditions on the die wall in complex domains. Although some existing methods satisfy part of the conditions quite well, they may not be so good in other parts. For instance, the well-known marker-and-cell method and the volume-of-fluid method work satisfactorily except for complex geometry, due to inherent limitations in the finite difference approach. Some other moving mesh methods are able to capture the motions of the free surface more accurately than the fixed mesh methods. The Lagrangian-Eulerian approach, however, still has problems whenever interfaces come into each other or the die wall. Since the filling stage is a dynamic process, the position of the moving surface as well as the velocity and pressure fields is unknown. Thus, an efficient iteration procedure which is independent of the geometry is required. As most of the iteration methods for steady problems (e.g. the spine method) depend on knowing how the free surface moves, and since the mesh must be generated to fit the motion, they are not suitable for general transient processes. Based on these reasons, we felt that a new method was required.

SUMMARY OF THE INVENTION

An efficient numerical procedure (the Net-Inflow method), has been developed for the simulation of Newtonian fluids with non-negligible inertial effect which satisfies the Navier-Stokes equations and the energy equation. This method has been extended to incorporate more general viscosity and solidification models to simulate the filling and solidification processes for the injection molding of Semi-Solid Metal in a two-dimensional thin cavity. The predictions have been compared with experimental results. The simulation results showed not only good agreement with the experiments but also helped us to explain the flow marks observed on the surface and the phase segregation in the cross section of the rheomolded spiral part.

We have developed a method to simulate the molding-filling process of incompressible viscous liquid, e.g. semi-solid metal, in a thin and irregular cavity. In this method, we track the moving free surfaces in an irregular domain by using a fixed-mesh method. The material discontinuities across the interface between air and the liquid has been removed by replacing the air with a pseudo-gas which has small density and dynamic viscosity but its kinematic viscosity is the same as that of the liquid. During the filling process, the (semi-solid) liquid may solidify on the mold surface. As a result, the effective cavity thickness reduces non-uniformly according to the result thermal analysis. We integrate the Navier-Stokes equations across the remaining gap by assuming that the velocity profile (not magnitude) is similar to that in a fully-developed flow.

In this method, the governing equations and interfacial boundary conditions can be expressed as Liquid:

$$\nabla \cdot (h_e v_a) = 0$$

$$\rho h_e \frac{\partial v_a}{\partial t} + 1.2 \rho h_e (v_a \cdot \nabla) v_a = -h_0 \nabla p - \frac{3\mu}{h_e} v_a$$

Pseudo-gas:

$p_{air} = p_0$ (uniform but not necessarily constant)

$$\rho h_e \frac{\partial v_a}{\partial t} + 1.2 \rho h_e (v_a \cdot \nabla) v_a = -\frac{3\mu}{h_e} v_a$$

Note: a constant, $\rho_{liquid}/\rho_{pseudo-gas}$ has been multiplied on both sides of this equation.

Interfacial boundary conditions for the liquid:

$p_{liquid} = p_{air}$ $\tau$(shear stress)=0

Interfacial boundary condition for the air:

$v_{a,air} = v_{a,liquid}$ where:

$v_a$ is the average velocity vector $\tau$ is the shear stress p is the pressure $\rho$ is the density $\mu$ is the dynamic viscosity $h_e$ is the effective half-gap thickness $h_o$ is the original half-gap thickness t is time According to an experimental observation, the viscosity of semi-solid metal reduces with increasing shear rate under steady state but is approximately independent of transient shear rate within a short period. By taking advantage of this phenomenon, the constant viscosity is pre-determined based on the initial shear rate and the no-flow temperature in the process.

Different from the above two-dimensional approach, the energy equilibrium requires a three-dimensional analysis. In order to account for possible latent heat released within a narrow temperature range during solidification, we express the energy balance in terms of temperature and enthalpy.

$$\rho \frac{\partial H}{\partial t} + k \frac{\partial^2 T}{\partial z^2} = -\rho(v \cdot \nabla) H$$

In the beginning of a new time step, the continuity and momentum equations and the interfacial boundary conditions are solved iteratively by using the Net-Inflow Method [See S. P. Wang and K. K. Wang, "A Net Inflow Method for Incompressible Viscous Flow with Moving Free Surface", *International Journal for Numerical Methods in Fluids*, Vol. 18, pp.669–694; and S. P. Wang and K. K. Wang, "A Net Inflow Method for Free-Surface Flow in Thin Cavities", *Computational Methods in Material Processing, Proceeding of the ASME Winter Annual Meeting*, Anaheim, Calif., Nov.8–13, 1992]. The new velocity is then used to calculate the energy convection. Based on the new temperature, we update the effective half-gap thickness for the next time step.

DESCRIPTION OF THE PREFERRED EMBODIMENT

The method of the invention was developed using a fixed mesh composed by control volume finite elements such that it can be applied in a complex domain easily. The domain (i.e. the simulated flow in the mold) is divided up into discrete mass control volumes (MCV's) and momentum control volumes. In order to improve the resolution of the method without refining the mesh, the method further divides each MCV into several sub-mass control volumes (SMaCV's).

Figure 5A:
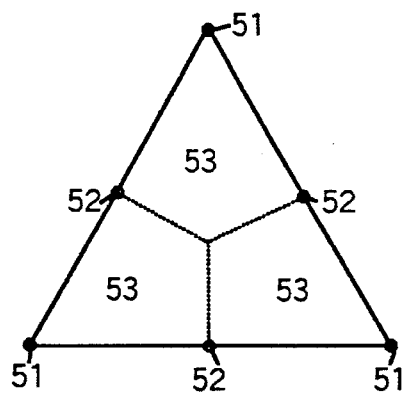
FIGS. 5a and 5b show a finite element as used in the method of the invention, divided to show SMaCVs and MomCVs.

This is illustrated in FIG. 5(a), which shows a simple triangular finite element of the mesh. The element has six nodes, three on the corners (51) and three at the midpoints of the sides (52). There are two velocity components (u,v) at each node (51) and (52), representing velocity in the x and y directions, respectively. Pressure (p) is calculated only at the vertex nodes (51). The element is divided into three subelements by joining the nodes (52) at the midpoints of the sides to a centroid (56), defining three sub-mass control volumes (SMaCVs) (53).

Figure 5B:
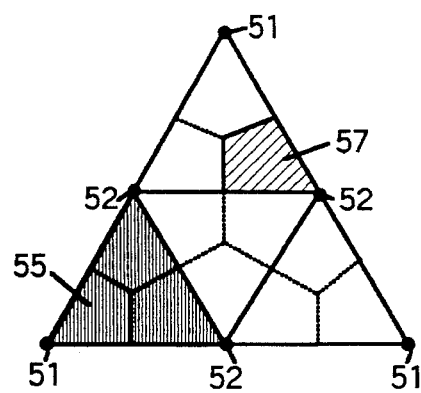

In FIG. 5(b), the element is divided into four subelements by connecting the middle nodes (52). The pressure is considered linear in each primary element, while the velocity is interpolated linearly on each subelement (55).

Figure 6:
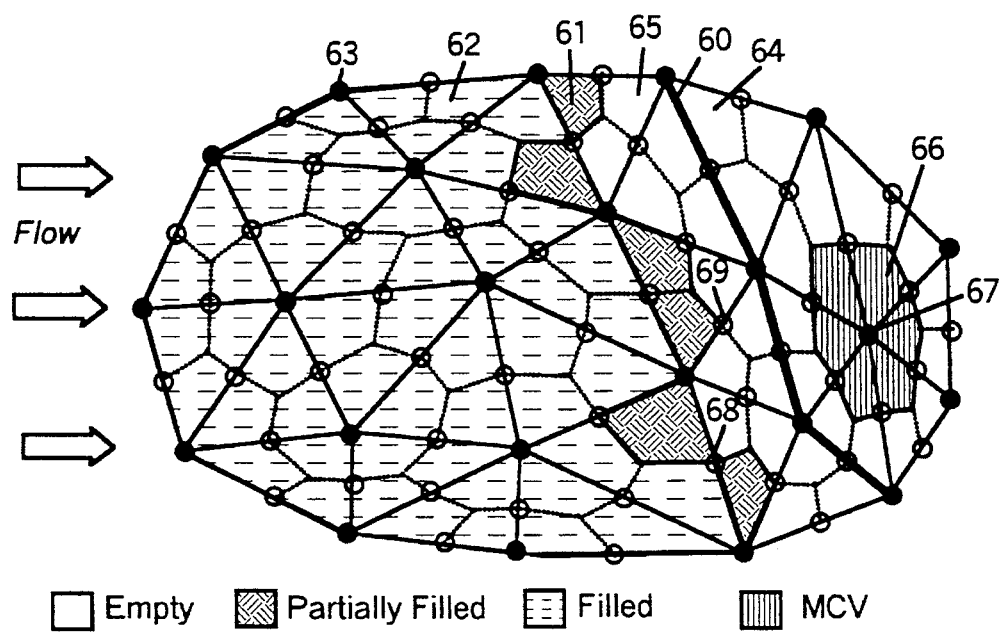
FIG. 6 shows an example of a part of a mesh, with filled, partially filled, and empty SMaCV's and the Computational Domain shown.

After an irregular domain is discretized with the triangular elements, as shown in FIG. 6, the SMaCV's attached to the same vertex node (67) constitute a mass control volume (MCV) (66). Such MCV's can be composed of one, two or more SMaCV's, depending on the number of elements containing the corresponding vertex node. For a given mesh, a flexible combination of these SMaCV's is much better than MCV's in fitting the irregular shape of the free surface. However, a special method will be required to enforce the incompressibility constraint on the velocity in an MCV in which not all of its SMaCV's are filled.

An element with all three of its SMaCV's are empty is designated an empty element (64). If all three SMaCV's are full, it is designated as full (62). All other elements are considered partially filled (61).

If a node is surrounded by only filled SMaCV's (67), it is called an "interior node". All other nodes are "exterior nodes." These exterior nodes are further divided into several groups, so that the free surface boundary conditions can be applied: exterior nodes associated with filled SMaCV's are known as "free surface nodes" (68), those immediately adjacent to free surface nodes (but not themselves associated with a filled SMaCV) are called "driven nodes." (69)

For handling momentum conservation, each subelement (55) is divided into three quadrilaterals (57), as shown in FIG. 5(b). A momentum control volume (MomCV) is a polygon composed of the quadrilaterals (57) associated with a given node.

In order to reduce the computational effort, we have integrated the continuity equation and the momentum equation in the transverse direction. After re-arrangement, the governing equations for the filling analysis of the rheomolding process in a two-dimensional thin cavity can be expressed as Continuity Equation
$$h_e \nabla \cdot v_a = 0 \quad (1)$$

Momentum Equation
$$\rho h_e \frac{\partial v_a}{\partial t} + 1.2 \rho h_e (v_a \cdot \nabla) v_a = -h_0 \nabla p - \frac{3\mu}{h_e} v_a \quad (2)$$

Energy Equation
$$\rho \frac{\partial H}{\partial t} + \rho(v_a \cdot \nabla H) = -k \frac{\partial^2 T}{\partial z^2} \quad (3)$$

where:

$\rho$ is density $\mu$ is viscosity k is thermal conductivity t is time $v_a$ is the average velocity vector (across the gap)

p is pressure

H is enthalpy

T is temperature

Due to solidification, the effective gap thickness $h_e$, through which the semi-solid slurry can flow, could reduce rapidly and non-uniformly from the original gap thickness, $h_o$. The continuity equation [Equation 1], the momentum equation [Equation 2] and the unknown moving free-surface position can be solved by using the Net-Inflow Method cited above. During each time step, after the velocity has been determined, the new temperature distribution can be calculated from [Equation 3]. Different from [Equation 1] and [Equation 2], the temperature in [Equation 3] requires a fully three-dimensional analysis. In the simulation of the plastic-injection-molding filling process, [Equation 3] can be solved by using a node-by-node iteration method. Nevertheless, the non-linear latent heat of metals could cause divergence to the iteration process unless the time step is very small. In this study, [Equation 3] is solved by using the same finite-element discretization as for the two-dimensional plane in [Equation 1] and [Equation 2]. The thermal conduction in the transverse direction is included by using the finite-difference scheme. The temperature within the region occupied by the slurry is solved simultaneously by using the Newton-Raphson method. Based on the updated temperature distribution and the given solidus temperature of the material, the thickness of the metal solidified on the mold surface $h_s$ can be determined. The effective half-gap thickness he in [Equation 2] is then defined as the difference between $h_0$ and $h_s$.

Figure 1:
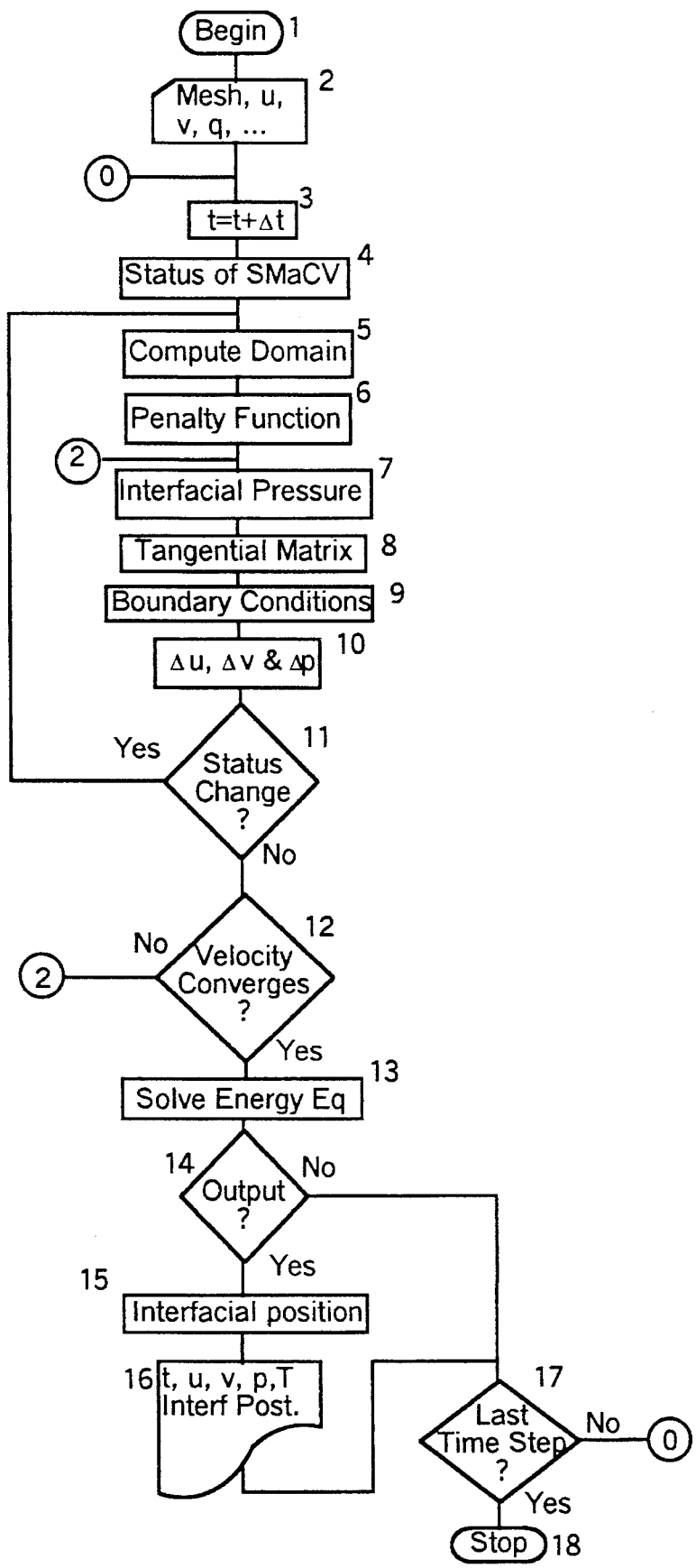
FIG. 1 shows a flowchart of the method of the invention

FIG. 1 shows the flowchart of the method of the invention. The method starts at (1), and the matrix representing the mesh, and other variables, are determined and input at (2) to prepare to execute the method of the invention.

At the beginning of a time step the time variable is incremented (3) by a predetermined amount $\Delta t$. The increment $\Delta t$ is chosen optimally such that the free-surface of the flowing material does not cross two SMaCV boundaries in one time increment. This will obviously vary based on the size of the elements, velocity of inflow, etc. The initial condition or the result from the previous time step is used as the initial guess for the succeeding steps.

The status of each SMaCV is then determined: filled, partially filled, or empty (4). The instantaneous volume of liquid in an SMaCV is the sum of its initial volume and the net inflow of liquid from the beginning until the time being analyzed. The net inflow rate is the sum of the volumetric flow rate through the SMaCV's four boundaries, which can be expressed for each boundary as:

$$\dot{q} = (v_c \cdot n_i) L$$

where:

L is the length of the boundary $v_c$ is the velocity vector at the center of the boundary, and $n_i$ is the inward unit vector perpendicular to the boundary As an implicit scheme, the velocity at the end of a given time step is used in this equation. It should be noted that the fluid flowing across a boundary is not necessarily liquid or air. In order to determine the actual amount of liquid flowing into a SMaCV, and effective flowing time $\delta t$ will be defined such that the volume of liquid flowing across a boundary during a time step is $$\Delta q = \dot{q} \times \delta t$$

During a time step, the fluid flowing through a boundary may be air, liquid, or both, depending on when the liquid reaches the boundary. This means that the effective flowing time of the liquid ($\delta t$) at a boundary may be equal to or less than the time step $\Delta t$. If $\delta t$ is always taken to be $\Delta t$, the magnitude of the velocity on the free surface will not be correct since the volume of liquid flowing across the boundary is limited. At the beginning of a time step, and effective flowing time is assigned to each SMaCV. The effective flowing time is $\Delta t$ if the SMaCV is filled, and zero otherwise. After each iteration the volume of liquid in each empty or partially filled SMaCV within the computational domain is updated. If the total volume of liquid in an SMaCV (computed as in the next step) is less than the total volume of the SMaCV at the beginning of a given time step and the updated volume becomes equal to or greater than the total volume after the ith iteration, the effective flowing time of the SMaCV should be updated as:

$$\delta t = \Delta t \left( 1 - \frac{Q - q^{k-1}}{q^k - q^{k-1}} \right)$$

where Q is the total volume of the SMaCV.

The total volume of liquid in an SMaCV at the end of the ith iteration of a time step k is updated by adding the net inflow through its boundaries, and is expressed as:

$$q^k = q^{k-1} + \sum_{n=1}^{m} \Delta q_n$$

where m is the number of boundaries with non-zero effective flowing time.

If the result of this calculation is zero, the SMaCV is considered empty. If it is larger than zero, but smaller than the total volume of the SMaCV, then the SMaCV is partially filled. Otherwise, the SMaCV is filled. It should be noted that the volume of liquid in a partially filled SMaCV should be updated after each iteration using this formula. It is possible that the calculated volume of fluid in a partially filled SMaCV may exceed its available volume during a given iteration. This simply means that the velocity in this SMaCV has not converged and the iteration should continue after the computational domain has been adjusted, as discussed further below.

The computational domain is then determined (5). This can be done by determining the status of the nodes—the nodes associated with empty SMaCV's, but adjoining driven nodes (driven nodes being those adjoining free-surface nodes—but which do not have at least one filled SMaCV themselves) will determine the border of the computational domain. Volumes outside of the computational domain will not be considered in the calculation.

The next step (6) is to solve the continuity equations, either explicitly or, preferably, implicitly using the penalty function method. For example, when using this method, the continuity equation and the corresponding liquid pressure are combined with the penalty function, defined as:

$$p_B = \frac{\Delta q_{in} + \Delta q_{a1,bi} + \Delta q_{c1,b1} + \Delta q_{b2,b1}}{\epsilon_p Q_{b1}}$$

where $\epsilon p$ is the penalty factor, which can be any positive number much smaller than unity, but still much larger than the truncation limit of the computer used to evaluate the function. When compared with the explicit method or other iterative solutions, the penalty function reduces the number of unknowns (pressure) and still offers fast convergence. However, the penalty factor must be small. If it is large, the compressibility error increases. On the other hand, the round-off error may become significant if the penalty factor is close to the truncation limit. In the foregoing equation, the compressibility error in the numerator is normalized by the control volume such that the percentage of the compression error is independent of the element size. For the problems we tested, a penalty factor between $10^{-4}$ and $10^{-7}$ seems to be appropriate.

The interfacial pressure is then computed (7). If the air pressure $p_0$ is taken to be zero, then the interfacial pressure in each subelement within a filled MCV can be expressed as:

$$p = 2\mu_1(n \cdot \nabla)(v \cdot n)$$

After the interfacial pressure in every filled SMaCV is obtained, the average is taken as the interfacial pressure at the vertex node. Since the interfacial pressure is calculated for the liquid, which is incompressible, it is important that the velocity be divergence-free. This is why the average is taken only among those subelements within the filled SMaCV's.

Based on the assumptions made in this method, the pressure of the pseudo-gas is uniform and is taken as the reference pressure. The liquid pressure at the vertex node associated with filled MCV's can be solved explicitly with the continuity equations or implicitly using the penalty functions. Therefore, the pressure within an empty or filled MCV can be determined.

However, the incompressibility constraint and the liquid pressure on the interface need further consideration. If some of the SMaCV's in an MCV are filled, but others are not, the vertex node within the MCV is considered on the interface. Since the interfacial pressure of the liquid on the free surface nodes is determined from the stress boundary condition on the interface in the equation above, it seems that the continuity equation is unnecessary on the interface.

However, the volume of liquid flowing between the filled and partially filled SMaCV's cannot be determined correctly unless the mass conservation of the liquid is satisfied within the filled SMaCV's. In particular, the velocity in a partially filled control volume is actually the average velocity of the liquid and air. This is one of the major reasons why the predicted velocity in a partially filled MCV needs to be adjusted to satisfy the incompressibility constraint.

In the present approach, the adjustment is made by the following method. At each vertex node on the free surface, two pressures are determined. One is the physical pressure obtained from the free surface boundary condition in the last-mentioned equation above, the other, which is called the pseudo-pressure, is associated with the incompressibility constraint of the liquid velocity within the filled SMaCV's of a partially filled MCV. Similar to the physical pressure, the pseudo-pressure is interpolated linearly over a primary element. However, there are two differences between them. First, since the pseudo-pressure is not the physical pressure, it should not affect the liquid pressure and the velocity of the interior nodes. Therefore the pseudo-pressure is excluded when integrating the force of the interior nodes in the momentum equation. Second, the pseudo-pressure in a primary element is multiplied by a weighting factor equal to the volume fraction of liquid in a SMaCV associated with the pseudo-pressure node. This weighting factor enforces the influence of the pseudo-pressure on the liquid velocity perpendicular to the interface.

As with the physical pressure at the interior nodes, the pseudo-pressure can be determined explicitly with the continuity equation or implicitly using the penalty function method.

In step (8) the governing equations are linearized by using the well-known Newton-Raphson method to obtain the tangential matrix [T], which includes all of the linearized equations on each node within the computational domain.

For the interfacial boundary conditions (9), the free surface nodes are considered on the liquid side, and the driven nodes on the air side of the interface. The no-slip boundary condition and the zero-shear-stress boundary condition are implemented by forcing the velocity at the driven nodes to follow the liquid velocity at the free surface nodes. To achieve this, the viscous force between the free surface nodes and the driven nodes is multiplied by a large constant $1/\epsilon_v$ when integrating on the driven nodes. On the other hand, this viscous force is excluded when integrating the forces on the free surface nodes. As a result the liquid velocity at the free surface nodes is not affected by the viscous diffusion from the pseudo-gas and the pseudo-gas velocity at the driven nodes follows the liquid velocity at the free surface nodes closely. The penalty factor $\epsilon_v$, multiplying the viscous force should be positive and much smaller than unity. In our experience it is appropriate to set $\epsilon_v$ such that $1/\epsilon_v = 10\, R_e$, where $R_e = \rho UL/\mu$ is the Reynolds Number.

The next step (10) is to calculate the changes in u,v and p. The tangential matrix [T], assembled in step (8), above, can be used to express the governing equations as follows, where $\Delta u$, $\Delta v$ denote the incremental velocity components in the x and y directions, $\Delta p$ is the incremental change in pressure, and $\Delta f$ is the unbalanced force:

$$[T] \left\{ \begin{array}{c} \Delta u \\ \Delta v \\ \Delta p \end{array} \right\} = \{\Delta f\},$$

without using the penalty function, or $$[T] \left\{ \begin{array}{c} \Delta u \\ \Delta v \end{array} \right\} = \{\Delta f\},$$

if the pressure has been replaced with the penalty function.

Either of the above two equations can be used to solve for $\Delta u$, $\Delta v$ and $\Delta p$.

The next step is to check for a change of status (unfilled to filled). The status has changed if the filling factor (filled volume of a control volume divided by the total volume) was less than 1, and has changed to greater than or equal to 1. If there is a change in status, then the method returns to the computational domain step (5) and iterates from there.

If there has not been a change in status, then the method proceeds to check for the velocity converging (12). If the root-mean-square of the incremental velocities $\Delta u$ and $\Delta v$ is less than a small number $\epsilon V$, then the velocity iteration has converged. $\epsilon$ is a positive number much smaller than 1 (preferably between $10^{-3}$ and $10^{-7}$) and V is the root-mean-square of the velocities, u and v.

If the velocity has not converged, then return to the step of computing interfacial pressure (7).

If the velocity has converged, then proceed to solving the energy equation (13) for each vertex node within the liquid region where the filling factor is 1:

$$\rho \frac{\partial H}{\partial t} + \rho(v_a \cdot \nabla H) = -k \frac{\partial^2 T}{\partial z^2}$$

The decision is then made whether or not to output the calculations (14). This decision is based on the requirements of the user of the method—results can be output every time step, every other time step, or some other increment desired by the user.

If the results are to be output, then the interfacial position is calculated (15) by linear interpolation the filling factors of the vertex nodes of each partially filled SMaCV, to find the position where the filling factor=0.5.

Then, the desired parameters are printed (16). These parameters will preferably include the time (t), the velocity in the x and y directions (u and v), the pressure, and the temperature for each element, and the interface position.

In either case, the method then checks to see if the last time step has been reached (17). If not, the method returns to the increment time step (3), and proceeds again for the next iteration. If the last time step has been reached, then the method is complete (18).

Mold Example: Spiral

Figure 2:
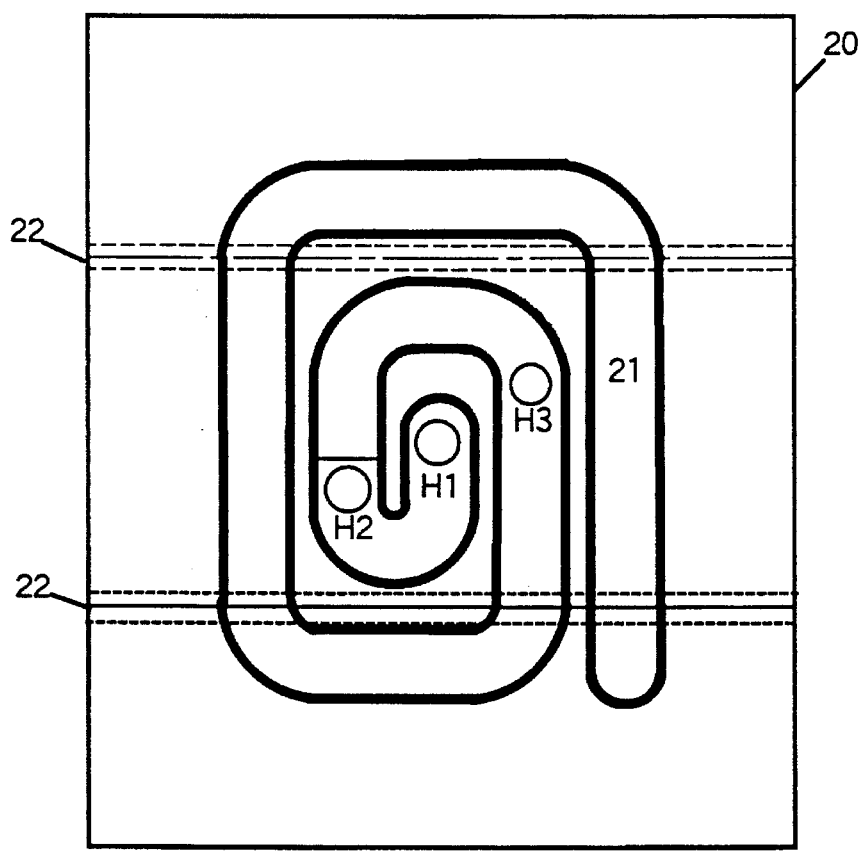
FIG. 2 shows the spiral mold used in the experiments testing the simulation method of the invention.

The example involved the use of a spiral steel mold (see FIG. 2). The simulation results for two cases are presented here.

The semi-solid metal was introduced at the center of the spiral (H1). Two pressure transducers were flush-mounted at two down-stream positions in the cavity (H2) and (H3). The half thickness is 1.5 mm, and the full width is 15 mm. Mold temperature was controlled by a water temperature-control unit. Temperatures (at hopper, barrel, nozzle and entrance of the spiral), ram position, screw-rotation speed, screw hydraulic pressure and pressure readings in the cavity were recorded by using a data acquisition system. The Sn-15% Pb was blended with an estimated shear rate of 200 sec$^{-1}$. The injection volume flow rate was set at $1.128 \times 10^{-4}$ m$^3$/sec. The whole spiral would be filled in 0.1 second at this injection speed. However, due to the rapid cooling and solidification in the mold, the filling stage stopped (i.e., short shot occurred) whenever the maximum pressure of the machine was reached.

Figure 3:
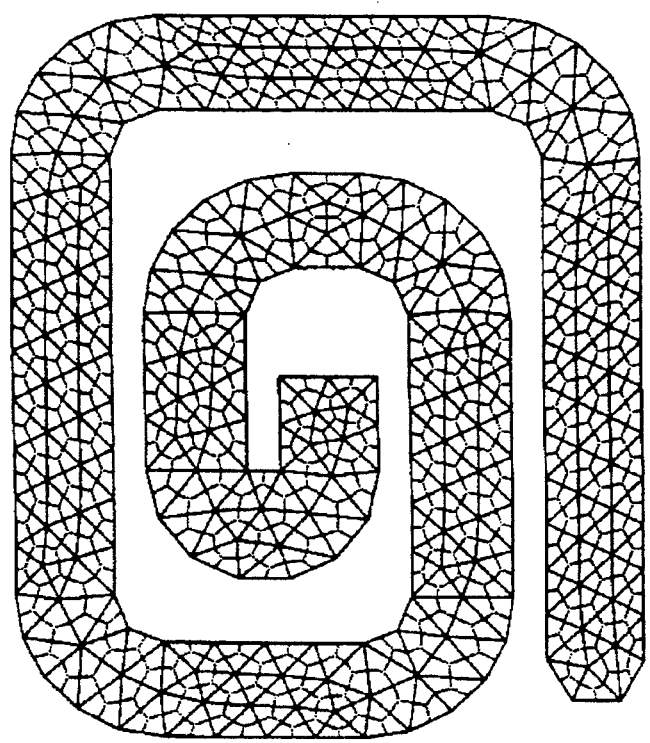
FIG. 3 shows the finite-element model used in the simulation of a spiral mold, as discussed in the example.
Figure 4A:
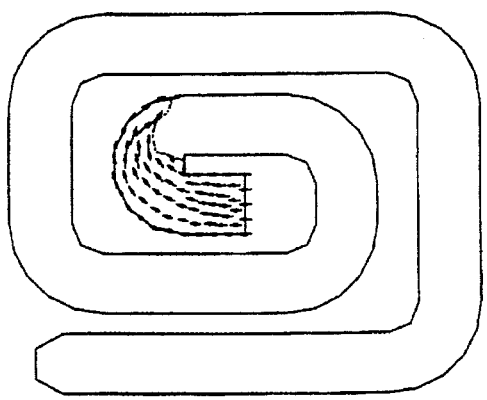
FIGS. 4a–f show predicted filling patterns at different times for two different temperatures.
Figure 4D:
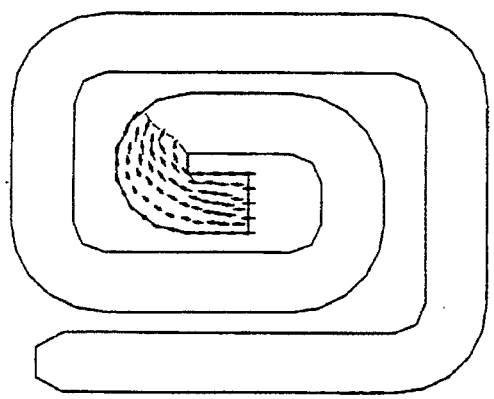
Figure 4B:
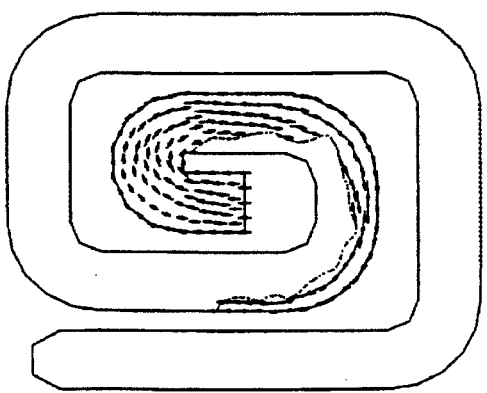
Figure 4E:
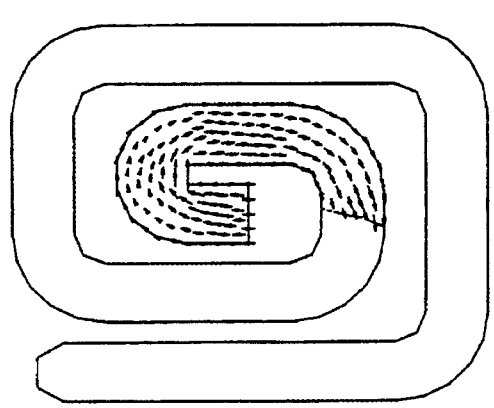
Figure 4C:
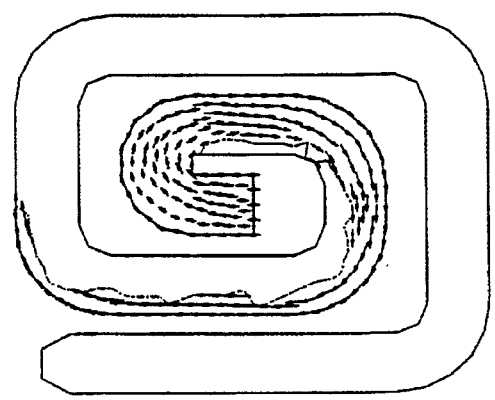
Figure 4F:
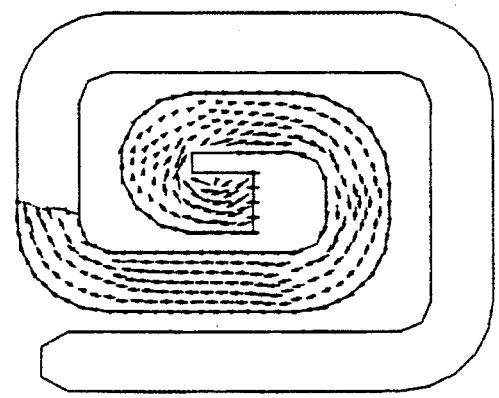

FIG. 3 shows the finite-element model used in our simulation, where the sprue and the half circular corner are excluded. There are six nodes in each triangular element, three at the vertices and one at each mid-side. On a vertex node, we calculate the velocity, pressure, temperature and the effective half-gap thickness. There are twelve nodes in the half gap for the thermal analysis. An estimated mold temperature, instead of the initial mold temperature, is used as the boundary condition in the thermal analysis because the temperature at the mold surface will not remain at 90° C. due to the large latent heat released during solidification. Only velocity is solved at the mid-side nodes. The pressure, temperature and the effective half-gap thickness are interpolated linearly within each element. The entrance velocity is taken to be uniform at 5 m/sec. The velocity boundary condition on the vertical wall of the spiral is no penetration and slipping without friction.

The following conditions applied to the cases studied in the example:

material: Sn-15% Pb Alloy density ($\rho$): 7700 Kg/m$^3$ specific heat: 240 J/Kg latent heat: $5.97 \times 10^4$ J/Kg thermal conductivity: 20.4 w/° Km$^2$ liquidus temperature: 211° C.

solidus temperature: 183° C.

injection temperature ($T_i$): Case 1: 211° C. Case 2: 205° C.

mold wall temperature ($T_w$): Case 1: 211° C. Case 2: 180° C.

Viscosity: Case 1: 0.0237 Pa-sec Case 2: 2.74 Pa-sec

Reynolds numbers ($\rho U h^2 / \mu L$): Case 1: 244 Case 2: 2.1

Characteristic Length (L): Spiral width

The viscosity is determined based on the processing temperatures and Turng's experimental results (See Turng, L. S., "Rheological Modeling and Numerical Simulation of Semi-solid Sn-15% Pb Alloy for Net-shape Die-casting Process", Ph.D. Dissertation, Cornell University, 1990).

The predicted filling pattern and the volume flow rate vector ($h_e v_a$) are compared in FIG. 4. Case 1 (FIG. 4*a–c*) is similar to the case in the conventional die-casting process. the liquid metal is apparently driven by its inertia and flows along the outer side of the spiral due to the centrifugal force. Case 2 is the condition expected for the rheomolding process. As the viscosity of the slurry increases the flow becomes much more stable. It should be noted in FIG. 4(e) that most of the slurry flows through the inner side of the spiral, where the path is shorter and the corresponding flow resistant is smaller, when it turns 180° after coming through the sprue. This phenomenon becomes even more clear in FIG. 4(f) because the material near the outer spiral has lower temperature and thinner effective gap due to weaker thermal convection.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. A method of simulating the behavior of materials in a mold, where the materials are in the form of a liquid containing semi-solid components, comprising the steps of:
   a) discretizing the mold into a fixed mesh comprising a plurality of triangular finite elements, each finite element having a vertex node at each corner, a centroid at the center of the finite element, and a side node midway between the vertex nodes on each side, each node having two velocity components u and v representing velocity in the x and y direction, respectively, and each vertex node having a pressure, each finite element being divided into three sub-mass control volumes SMaCV's along lines derived by joining the side nodes and the centroid;
   b) incrementing the time by predetermined time step;
   c) determining the status of each SMaCV, wherein a SMaCV is considered empty if there is no liquid in the SMaCV, partially filled if the volume of liquid q is more than zero but less than the total volume Q of the SMaCV, and filled otherwise;
   d) determining the computational domain, comprising the set of SMaCV's having at least one node which is an interior, driven or free-surface node, or which has a node adjoining a driven node even if all of the SMaCV's associated with the node are empty, wherein an interior node is one which adjoins only filled SMaCV's, a free-surface node is one which is not interior, but which is associated with filled SMaCV's, and a driven node is one which adjoins a free-surface node but which is not itself associated with a filled SMaCV;
   e) for all SMaCV's in the computational domain, solving the continuity equations;
   f) determining the interfacial pressure between each SMaCV and the adjoining SMaCV's;
   g) computing the tangential matrix [T];
   h) computing the boundary conditions;
   i) computing the change in velocities u and v and filled volume q;
   j) checking each SMaCV for a change in filled/unfilled status, and returning to step d) if there has been a change in status;
   k) checking if the velocity has converged, and returning to step f) if the velocity has not converged;
   l) solving the energy equation;
   m) determining if the last time step has been reached, and returning to step b) if it has not; and
   o) controlling an injection molding process in accordance with the solved energy equation.

2. The method of claim 1 further comprising the steps, between steps l) and m) of claim 1, of:
   a) computing the interfacial position; b) outputting the results of the calculations for the time step.

3. The method of claim 2, in which the output comprises at least the time and, for each element in the computational domain, the velocities u and v and the pressure and temperature.

4. The method of claim 1 in which the time step in step b) is determined to be a time increment such that the flowing liquid in the mold does not cross two SMaCV boundaries in a single time step.

5. The method of claim 1 in which the status of a SMaCV is determined by computing the total volume of liquid by adding the net inflow through the boundaries of the SMaCV during the time step by an iterative process where the total volume of liquid in a SMaCV having m boundaries with non-zero effective flowing time at the end of the ith iteration of step k is expressed as $$q_i^k = q^{k-1} + \sum_{n=1}^{m} \Delta q_n.$$

6. The method of claim 5 in which $\Delta q$ the liquid flowing across a boundary during a time step $\Delta t$ is $\Delta q = \dot{q} \times \delta t$ where $\delta t$ is an effective flowing time less than or equal to the time step $\Delta t$, and the net inflow for each of the boundaries of the SMaCV is $\dot{q} = (v_c \cdot n_i)L$ where L is the length of the boundary, $v_c$ is the velocity vector at the center f of the boundary, and $n_i$ is the inward unit vector perpendicular to the boundary.

7. The method of claim 1, in which the continuity equations of step e) are solved explicitly.

8. The method of claim 7, in which the continuity equation is $h_e \nabla \cdot v_a = 0$ where $h_e$ is effective half-gap thickness, and $v_a$ is the average velocity vector.

9. The method of claim 1 in which the continuity equation in step e) is solved implicitly using the penalty function method.

10. The method of claim 9 in which the penalty function is $$p_B = \frac{\Delta q_{in} + \Delta q_{a1,bi} + \Delta q_{c1,b1} + \Delta q_{b2,b1}}{\epsilon_p Q_{b1}}$$

where the penalty factor $\epsilon_p$ is a selected number less than unity.

11. The method of claim 10 in which the penalty factor $\epsilon_p$ is between $10^{-4}$ and $10^{-7}$.

12. The method of claim 1 in which the interfacial pressure in step f) is computed as $p = 2\mu_1(n \cdot \nabla)(v \cdot n)$.

13. The method of claim 1 in which the tangential matrix [T] in step g) is computed by the Newton-Raphson method.

14. The method of claim 1 in which the incremental velocities $\Delta u$ and $\Delta v$ and pressure $\Delta p$ are computed using the tangential matrix [T] and unbalanced force f using the equation:

$$[T] \left\{ \begin{array}{c} \Delta u \\ \Delta v \\ \Delta p \end{array} \right\} = \{\Delta f\}.$$

15. The method of claim 1, in which the incremental velocities $\Delta u$ and $\Delta v$ are computed using the tangential matrix [T] and unbalanced force f using the equation:

$$[T] \left\{ \begin{array}{c} \Delta u \\ \Delta v \end{array} \right\} = \{\Delta f\}.$$

16. The method of claim 1, in which the determination of a change in status of an SMaCV of step j) comprises the steps of:

comparing the status of the SMaCV determined in step c) in the current time step with the status of the SMaCV determined in step c) of the previous time step;

considering the status to have changed if the status determined in step c) of the current time step is different from the status determined in step c) of the previous time step.

17. The method of claim 1, in which the checking for convergence of velocity in step k) comprises the steps of:

a) computing the root-mean-square $\Delta V$ of the incremental velocities $\Delta u$ and $\Delta v$;

b) computing the root-mean-square V of the velocities u and v;

c) multiplying the root-mean-square velocity V by $\epsilon$, where $\epsilon$ is a positive number much smaller than 1;

d) comparing the results of step a) with the results of step c); and e) considering the velocity to have converged if $\Delta V < \epsilon V$.

18. The method of claim 17, in which $\epsilon$ is between $10^{-3}$ and $10^{-7}$.

19. The method of claim 1, in which the energy equation in step l) is:

$$\rho \frac{\partial H}{\partial t} + \rho(v_a \cdot \nabla H) = -k \frac{\partial^2 T}{\partial z^2}.$$

\* \* \* \* \*